US011288301B2

(12) United States Patent
Lippsett et al.

(10) Patent No.: US 11,288,301 B2
(45) Date of Patent: Mar. 29, 2022

(54) YAML CONFIGURATION MODELING

(71) Applicant: Google LLC, Mountain View, CA (US)

(72) Inventors: Molly Lippsett, La Selva Beach, CA (US); Dave Markowitz, Soquel, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/556,410

(22) Filed: Aug. 30, 2019

(65) Prior Publication Data

US 2021/0064644 A1 Mar. 4, 2021

(51) Int. Cl.
| | |
|---|---|
| G06F 16/35 | (2019.01) |
| G06F 16/338 | (2019.01) |
| G06F 9/50 | (2006.01) |
| G06F 40/194 | (2020.01) |
| G06F 40/205 | (2020.01) |

(52) U.S. Cl.
CPC .......... *G06F 16/358* (2019.01); *G06F 9/5077* (2013.01); *G06F 16/338* (2019.01); *G06F 40/194* (2020.01); *G06F 40/205* (2020.01)

(58) Field of Classification Search
CPC .............................. G06F 40/194; G06F 40/205
USPC ........................................................ 715/200
See application file for complete search history.

(56) References Cited

U.S. PATENT DOCUMENTS

| | | | | |
|---|---|---|---|---|
| 7,016,974 | B2* | 3/2006 | Theriault | G06T 1/60 |
| | | | | 707/999.01 |
| 7,606,889 | B1* | 10/2009 | Kundala | H04L 41/0866 |
| | | | | 709/220 |
| 9,590,854 | B1* | 3/2017 | Shekhar | H04L 41/0873 |
| 10,382,285 | B2* | 8/2019 | Patel | H04L 41/145 |
| 10,515,005 | B1* | 12/2019 | Burrell | G06F 11/368 |
| 10,613,961 | B2* | 4/2020 | Chen | G06F 9/455 |
| 2003/0074430 | A1* | 4/2003 | Gieseke | H04L 41/0213 |
| | | | | 709/221 |
| 2003/0149756 | A1* | 8/2003 | Grieve | H04L 41/0866 |
| | | | | 709/223 |
| 2005/0086646 | A1* | 4/2005 | Zahavi | G06F 3/00 |
| | | | | 717/131 |
| 2005/0097517 | A1* | 5/2005 | Goin | H04L 43/06 |
| | | | | 717/124 |
| 2006/0047798 | A1* | 3/2006 | Feinleib | G06F 8/61 |
| | | | | 709/223 |
| 2006/0107062 | A1* | 5/2006 | Fauthoux | H04L 9/0891 |
| | | | | 713/182 |
| 2006/0168152 | A1* | 7/2006 | Soluk | H04L 67/2819 |
| | | | | 709/220 |

(Continued)

*Primary Examiner* — Daniel Rodriguez
(74) *Attorney, Agent, or Firm* — Honigman LLP; Brett A. Krueger

(57) ABSTRACT

A method, system and computer program product for YAML configuration exploration includes importing from fixed storage into memory of a computing system, a multiplicity of YAML conformant configuration files, parsing each of the imported YAML conformant configuration files and storing each element of each of the parsed YAML conformant configuration files in a database. The method additionally includes generating a data model from the stored elements in the database. Finally, the method includes presenting a data visualization of at least a portion of the generated data model including elements from at least two different ones of the imported YAML conformant configuration files.

20 Claims, 2 Drawing Sheets

(56) References Cited

U.S. PATENT DOCUMENTS

| | | | |
|---|---|---|---|
| 2007/0245327 A1* | 10/2007 | Dietz | G06F 8/74 717/143 |
| 2008/0120320 A1* | 5/2008 | Chambliss | G06F 11/3495 |
| 2010/0042639 A1* | 2/2010 | Grinshpun | H04L 41/0846 707/602 |
| 2010/0095348 A1* | 4/2010 | Foster | G06F 21/6236 726/1 |
| 2010/0223253 A1* | 9/2010 | Gopal | G06F 16/217 707/713 |
| 2010/0319060 A1* | 12/2010 | Aiken | G06F 9/50 726/7 |
| 2011/0265064 A1* | 10/2011 | Hadar | G06F 11/3409 717/121 |
| 2012/0096065 A1* | 4/2012 | Suit | H04L 41/0853 709/202 |
| 2012/0096134 A1* | 4/2012 | Suit | H04L 12/6418 709/221 |
| 2012/0102543 A1* | 4/2012 | Kohli | H04L 63/20 726/1 |
| 2013/0198569 A1* | 8/2013 | Eidelman | G06F 11/2268 714/32 |
| 2017/0279853 A1* | 9/2017 | Armstrong | H04L 43/062 |
| 2018/0136970 A1* | 5/2018 | Nandagopal | G06F 9/4843 |
| 2018/0314518 A1* | 11/2018 | Ari | G06F 16/137 |
| 2019/0079853 A1* | 3/2019 | Makkar | G06F 8/71 |
| 2019/0147016 A1* | 5/2019 | Currenti | G06F 16/13 715/213 |
| 2019/0229983 A1* | 7/2019 | Govindaraju | H04L 41/082 |
| 2019/0319926 A1* | 10/2019 | Cummins | H04L 63/0263 |
| 2020/0151022 A1* | 5/2020 | Goudarzi | G06F 9/44505 |
| 2020/0184009 A1* | 6/2020 | Wood | H04L 41/0813 |
| 2020/0186445 A1* | 6/2020 | Govindaraju | H04L 67/10 |
| 2020/0241993 A1* | 7/2020 | Chen | G06F 9/5027 |
| 2020/0267071 A1* | 8/2020 | Ghag | H04L 41/142 |

\* cited by examiner

YAML CONFIGURATION MODELING

BACKGROUND OF THE INVENTION

Field of the Invention

The present invention relates to the field of configuration file management and more particularly to the modeling and visualization of a system configuration.

Description of the Related Art

Conventionally, computer programs execute within an operating system environment on the bare metal of a computer with the operating system processing the program instructions of the computer program and providing moderated access to the resources of the computer. In the modern era of computing, however, the execution of multiple different programs within the same computer has become an essential requirement. To that end, virtualization is a technology that permits the execution of different computer program instances in different isolated virtual machines, known as "guests" and managed by a supervising process, known as a "hypervisor". Each virtual machine is isolated from each other virtual machine such that each instance of a computer program executing within a corresponding virtual machine remains completely isolated from other instances of the same program or other programs.

The use of virtualization, however, is not without consequence. Each virtual machine, as a guest operating system, must in of itself, support the operation of an operating system able to host the execution of a corresponding computer program instance. As will be understood, multiple different operating systems executing within corresponding virtual machines in a single computing system can consume substantial resources of the computing system thus affecting the performance of all host applications in their respective virtual machines.

To address the excess resource consumption of virtualization, containerization oftentimes is employed as a suitable substitute—especially where multiple instances of a single computer program are to be deployed within the same host computing system. Unlike virtualization, in containerization, no separate operating system is deployed in each container. Thus, containerization demands less resource consumption and thus higher operational performance for all instance of a computer program executing in a containerized host computing system. Even still, like a virtualized environment, in a containerized environment, each container must be configured with respect to the underlying resources of the host computing system such as permitted memory utilization, processor utilization, persistent storage, access control and the like. Whether in a virtualized environment or a containerized environment, managing the configuration of multiple containers within multiple containerized computing systems presents an enormous challenge.

In order to manage a coordinated configuration of a containerized host environment, standardized methods of defining different configurations have been developed so that a container may be configured simply in reference to a configuration definition and so that a configuration of a container may be expressed as a definition. Popularly, YAML as a serialization language is employed to describe a configuration of a container. A YAML conformant document is able to be parsed and its content interpreted so as to produce a defined configuration. Notably, while reading a YAML conformant configuration file is easy enough, reading and comparing multiple different YAML conformant configuration files in order to best understand the differences and similarities therebetween can become increasingly difficult if not impossible for many different configurations for many different containers.

BRIEF SUMMARY OF THE INVENTION

Embodiments of the present invention address deficiencies of the art in respect to configuration file management and provide a novel and non-obvious method, system and computer program product for YAML configuration exploration. In an embodiment of the invention, a YAML configuration exploration method includes importing from fixed storage into memory of a computing system, a multiplicity of YAML conformant configuration files, parsing each of the imported YAML conformant configuration files and storing each element of each of the parsed YAML conformant configuration files in a database. The method additionally includes generating a data model from the stored elements in the database. Finally, the method includes presenting a data visualization of at least a portion of the generated data model including elements from at least two different ones of the imported YAML conformant configuration files.

In one aspect of the embodiment, the method additionally includes showing in the data visualization, a comparison of a configuration reflected by a comparison of two or more different imported YAML conformant configuration files. To that end, the comparison may indicate a deviation of the configuration of the one of the imported YAML conformant configuration files from a standard configuration reflected by another of the imported YAML conformant configuration files. For instance, the YAML conformant configuration files each may reflect a configuration of a corresponding short-lived Linux container.

Hence, the presentation of the data visualization may be a data visualization of at least a portion of the generated data model that includes elements from one of the imported YAML conformant configuration files reflecting a configuration of a contemporaneously executing short-lived Linux container and elements from another of the YAML conformant configuration files reflecting a configuration of a similar previously executed short-lived Linux container. Finally, in yet another aspect of the embodiment, the YAML conformant configuration file of the similar previously executed short-lived container may be applied to the contemporaneously executing short-lived Linux container responsive to a determination of sub-standard performance in the contemporaneously executing short-lived Linux container.

In another embodiment of the invention, a YAML configuration exploration data processing system includes a host computing platform that includes one or more computers, each with memory and at least one processor. The system additionally includes a database accessible in the host computing platform and a data modeling system executing in the host computing platform and adapted to model data in the database and to generate data visualizations of the modeled data. Finally, the system includes a YAML configuration exploration module also executing in the host computing platform, the module including computer program instructions enabled upon execution to import from fixed storage into the memory of the host computing platform, a multiplicity of YAML conformant configuration files, to parse each of the imported YAML conformant configuration files and store each element of each of the parsed YAML conformant configuration files in the database, to direct the data modeling system to generate a data model from the stored elements in the database, and to direct the data modeling system to present a data visualization of at least a portion of the generated data model including elements from at least two different ones of the imported YAML conformant configuration files.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for YAML configuration exploration. In accordance with an embodiment of the invention, two or more different YAML conformant configuration files are parsed into different elements for each of the files and the different elements are stored in a database. A model then may be generated from the stored elements in the database. Finally, a data visualization of at least a portion of the generated data model may be presented including elements from at least two different imported YAML conformant configuration files. In this way, the differences and similarities between the YAML conformant configuration files may be visually observable.

Figure 1:
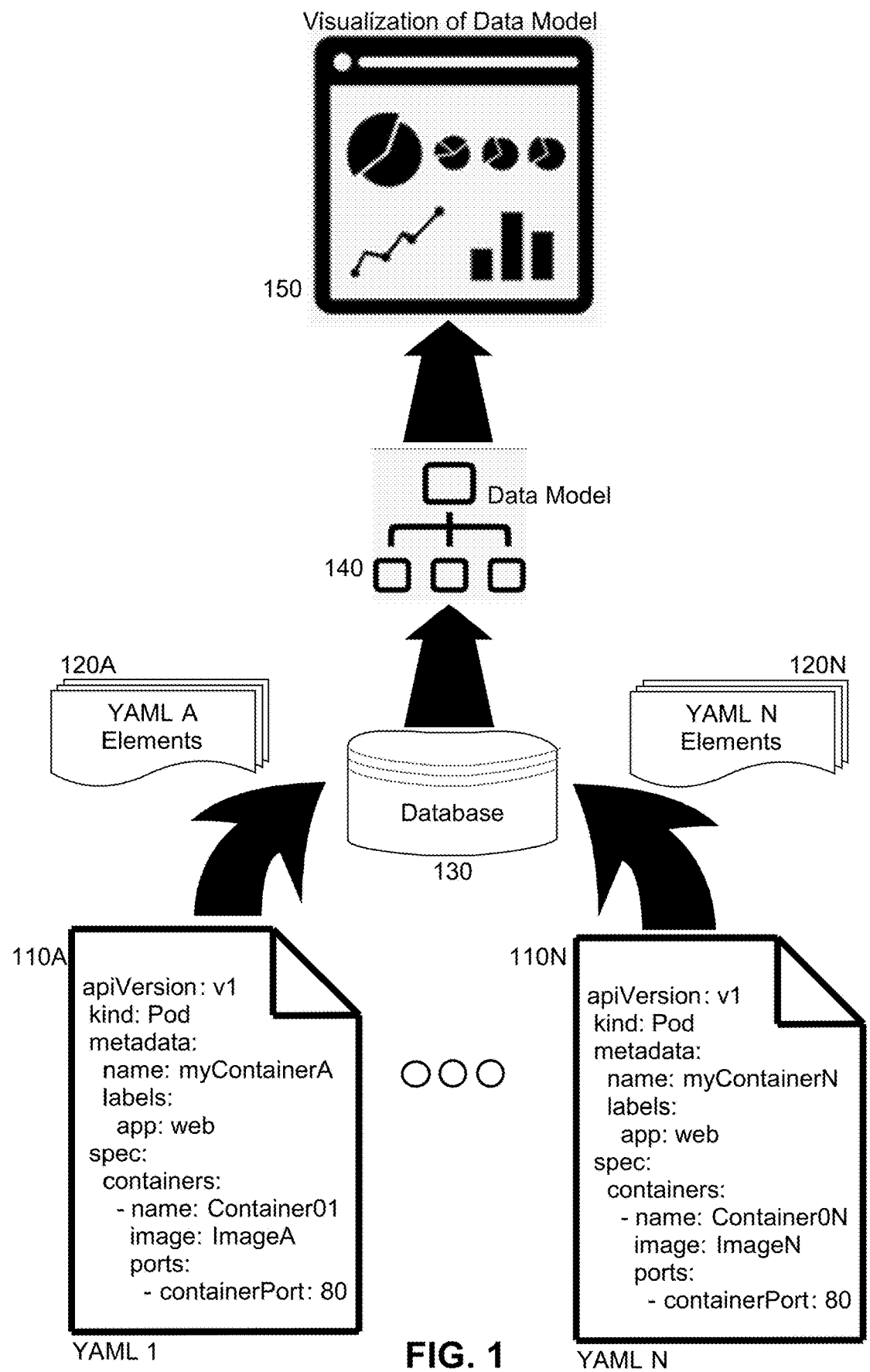
FIG. 1 is pictorial illustration of a process for YAML configuration exploration.

In further illustration, FIG. 1 pictorially shows a process for YAML configuration exploration. As shown in FIG. 1, multiple different YAML configuration files 110A . . . 110N for respective containers in a containerized environment are parsed into constituent elements 120A . . . 120N. The constituent elements 120A . . . 120N are then stored in database 130. A data model 140 is then generated from the elements 120A . . . 120N in the database 130. In this regard, the data model 140 includes a hierarchy of nodes relating how the different elements 120A . . . 120N of the database 130 relate to one another. Finally, a visualization 150 is then presented based upon the generated model 140.

Figure 2:
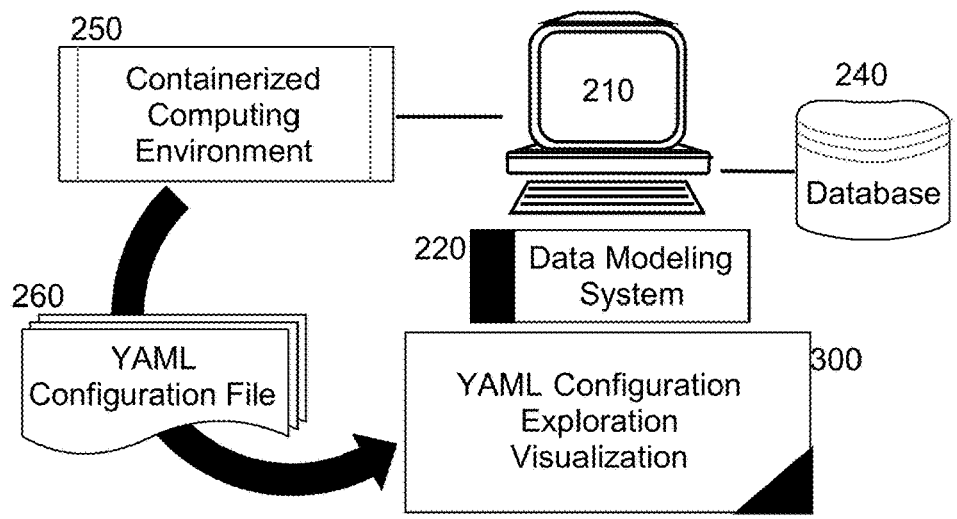
FIG. 2 is a schematic illustration of a data processing system adapted for YAML configuration exploration; and, FIG. 3 is a flow chart illustrating a process for YAML configuration exploration.

The process described in connection with FIG. 1 may be implemented within a data processing system. In further illustration, FIG. 2 schematically shows a data processing system adapted for YAML configuration exploration. The system includes a host computing system 210 that includes one or more computers, each with memory and at least one processor. A data modeling system 220 executes in the host computing system 210. The data modeling system 220 is configured to generate data models from data within a database 240. The system yet further includes a containerized computing environment 250 that supports container hosting of different instances of a computer program. In this regard, the containerized computing environment 250 is enabled to generated different short-lived Linux containers utilizing Linux kernel containment facilities according to different configurations specified according to different YAML configuration files 260.

Notably, a YAML configuration exploration visualization module 300 executes in the memory of the host computing system 210. The YAML configuration exploration visualization module 300 includes computer program instructions enabled during execution in the memory of the host computing system 210 to parse each of the YAML configuration files 260 into their constituent elements and to insert those elements into the database 240. The program instructions are further enabled to generate a data model from the elements stored in the database 240. Finally, the program instructions are enabled to present a data visualization of the data model in a display of the host computing system 210.

To that end, the data visualization can include a visualized comparison of a configuration reflected by one of the different ones of the YAML configuration files 260 with another configuration reflected by another of the YAML configuration files 260 so that similarities and differences therebetween can be recognized by a comparison of a visualization of elements of each of the YAML configuration files 260 in the data model. Alternatively, to the extent that one of the YAML configuration files 260 reflects a standardized configuration of a container within the containerized computing environment, the comparison indicates a deviation from the standard configuration by another configuration reflected by the other of the YAML configuration files 260. As yet another alternative, the visualization can include a visualization of the elements of one of the YAML configuration files 260 for a contemporaneously executing container in the containerized computing environment 250 as compared to the elements of another of the YAML configuration files 260 for a previously executed container in the containerized computing environment 260. In the latter instance, the visualization can be presented in response to a determination of sub-standard performance in the contemporaneously executing container in the containerized computing environment 250.

Figure 3:
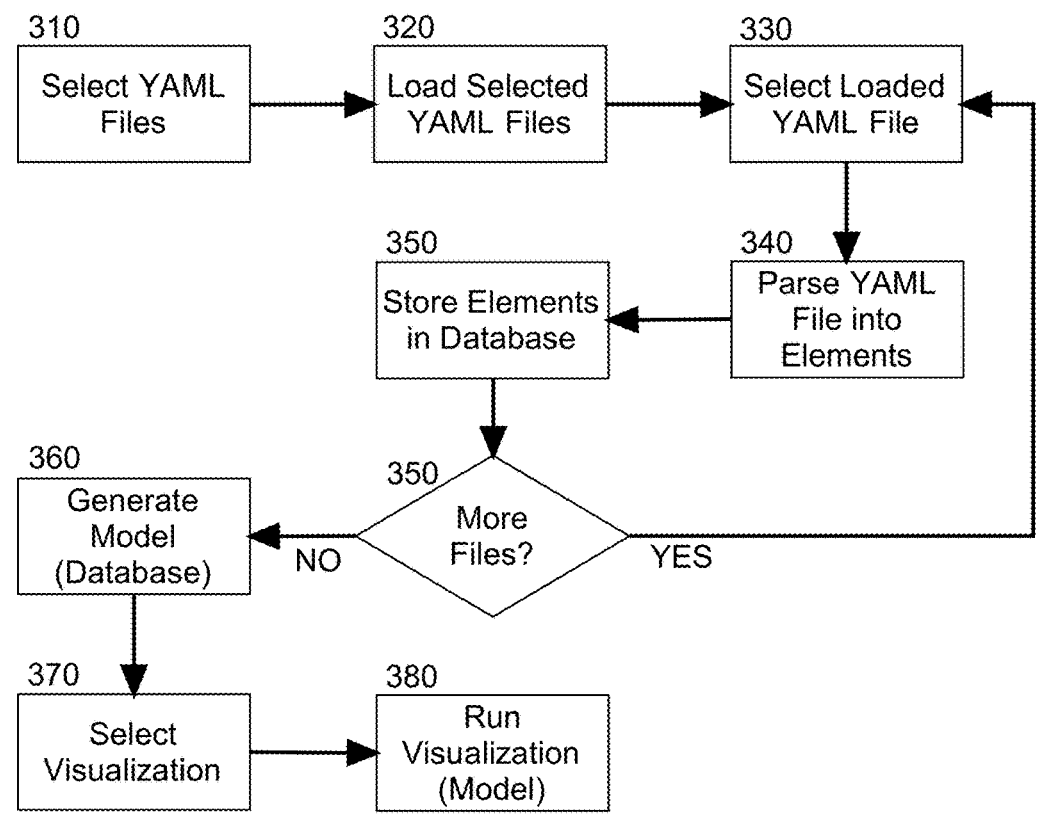

In even yet further illustration of the operation of the YAML configuration exploration visualization 300, FIG. 3 is a flow chart illustrating a process for YAML configuration exploration. Beginning in block 310, a set of YAML configuration files for a containerized computing environment are selected for visualization. In block 320, the selected YAML configuration files are loaded into memory and in block 330, a first of the loaded YAML configuration files is selected for parsing in block 340 into different elements. In block 350, the parsed elements are stored in a database and the process repeats in decision block 350 for each other of the selected YAML configuration files. In decision block 350, when no more YAML configuration files remain, the process continues through block 360.

In block 360, a data model is then generated from the elements in the database. Then, in block 370 a specific visualization is selected such as a visualization comparing elements of two contemporaneously executing containers, one contemporaneously executing container and a previously executing container, or a contemporaneously executing container and a standard container. Optionally, the visualization can be selected in response to a determination that the contemporaneously executing container performs below a threshold value. Finally, in block 380, the selected visualization is executed so as to display the visualization in a display of the host computing system.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A YAML configuration exploration method comprising:
    importing from fixed storage into memory of a computing system, a multiplicity of YAML conformant configuration files each reflecting a configuration of a corresponding container in a containerized environment;
    for each of the imported multiplicity of YAML conformant configuration files:
        parsing the corresponding YAML conformant configuration file; and
        storing each element of the parsed YAML conformant configuration file in a database;
    generating a data model from the stored elements in the database;
    determining whether performance of a contemporaneously executing container in the containerized environment fails to satisfy a threshold value;
    in response to determining that performance of the contemporaneously executing container fails to satisfy the threshold value, automatically selecting a data visualization from a plurality of data visualizations, the selected data visualization comprising a visualization comparing each element of the corresponding parsed YAML conformant configuration file that reflects the configuration of the contemporaneously executing container with at least one different parsed YAML conformant configuration file that reflects the configuration of a different corresponding contemporaneously executing container in the containerized environment; and presenting the selected data visualization of at least a portion of the generated data model including elements from the corresponding parsed YAML conformant configuration file that reflects the configuration of the contemporaneously executing container and the at least one different parsed YAML conformant configuration file that reflects the configuration of the different corresponding contemporaneously executing container in the containerized environment.

2. The method of claim 1, wherein the selected data visualization indicates a deviation of the parsed YAML conformant configuration file that reflects the configuration of the contemporaneously executing container from the at least one different parsed YAML conformant configuration file that reflects the configuration of the different corresponding contemporaneously executing container in the containerized environment.

3. The method of claim 1, wherein the selected data visualization indicates a deviation of the parsed YAML conformant configuration file that reflects the configuration of the contemporaneously executing container from a standard configuration reflected by another of the imported YAML conformant configuration files.

4. The method of claim 3, wherein the multiplicity of YAML conformant configuration files each reflect a configuration of a corresponding short-lived Linux container.

5. The method of claim 4, wherein the presentation of the selected data visualization includes elements of the corresponding parsed YAML conformant configuration file that reflects the configuration of the contemporaneously executing short-lived Linux container and elements from the at least one different parsed YAML conformant configuration file that reflects a configuration of a similar previously executed short-lived Linux container.

6. The method of claim 5, further comprising applying the YAML conformant configuration file of the similar previously executed short-lived Linux container to the contemporaneously executing short-lived Linux container responsive to determining that performance of the contemporaneously executing short-lived Linux container fails to satisfy the threshold value.

7. The method of claim 1, wherein automatically selecting the data visualization is further based on a comparison of the contemporaneously executing container in the containerized environment to the different contemporaneously executing container in the containerized environment, the contemporaneously executing container and the different contemporaneously executing container each comprising a different corresponding short-lived Linux container.

8. The method of claim 1, wherein the contemporaneously executing container comprises a short-lived Linux container.

9. A YAML configuration exploration data processing system comprising:
a host computing platform comprising one or more computers, each with memory and at least one processor:
a database accessible in the host computing platform;
a data modeling system executing in the host computing platform and adapted to model data in the database and to generate data visualizations of the modeled data; and,
a YAML configuration exploration module also executing in the host computing platform, the YAML configuration exploration module comprising computer program instructions enabled upon execution to perform:
importing from fixed storage into the memory of the host computing platform, a multiplicity of YAML conformant configuration files each reflecting a configuration of a corresponding container in a containerized environment;
for each of the imported multiplicity of YAML conformant configuration files:
parsing the corresponding YAML conformant configuration file; and
storing each element of the parsed YAML conformant configuration file in the database;
directing the data modeling system to generate a data model from the stored elements in the database;
directing the data modeling system to determine whether performance of a contemporaneously executing container in the containerized environment fails to satisfy a threshold value;
in response to determining that performance of the contemporaneously executing container fails to satisfy the threshold value, directing the data modeling system to automatically select a data visualization from a plurality of data visualizations, the selected data visualization comprising a visualization comparing each element of the corresponding parsed YAML conformant configuration file that reflects the configuration of the contemporaneously executing container with at least one different parsed YAML conformant configuration file that reflects the configuration of a different corresponding contemporaneously executing container in the containerized environment; and
directing the data modeling system to present the selected data visualization of at least a portion of the generated data model including elements from the corresponding parsed YAML conformant configuration file that reflects the configuration of the contemporaneously executing container and the at least one different parsed YAML conformant configuration file that reflects the configuration of the different corresponding contemporaneously executing container in the containerized environment.

10. The system of claim 9, wherein the selected data visualization indicates a deviation of the parsed YAML conformant configuration file that reflects the configuration of the contemporaneously executing container from the at least one different parsed YAML conformant configuration file that reflects the configuration of the difference corresponding contemporaneously executing container in the containerized environment.

11. The system of claim 9, wherein the selected data visualization indicates a deviation of the parsed YAML conformant configuration file that reflects the configuration of the contemporaneously executing container from a standard configuration reflected by another of the imported YAML conformant configuration files.

12. The system of claim 11, wherein the multiplicity of YAML conformant configuration files each reflect a configuration of a corresponding short-lived Linux container.

13. The system of claim 12, wherein the presentation of the selected data visualization includes elements of the corresponding parsed YAML conformant configuration file that reflects the configuration of the contemporaneously executing short-lived Linux container and elements from the at least one different parsed YAML conformant configuration files that reflects a configuration of a similar previously executed short-lived Linux container.

14. The system of claim 13, wherein the program instructions are further enabled to direct the data modeling system to display a prompt in the selected data visualization for an application of the YAML conformant configuration file of the similar previously executed short-lived Linux container to the contemporaneously executing short-lived Linux container responsive to determining that performance of the contemporaneously executing short-lived Linux container fails to satisfy the threshold value.

15. A computer program product for YAML configuration exploration, the computer program product including a non-transitory computer readable storage medium having program instructions embodied therewith, the program instructions executable by a device to cause the device to perform a method including:
  importing from fixed storage into memory of a computing system, a multiplicity of YAML conformant configuration files each reflecting a configuration of a corresponding container in a containerized environment;
  for each of the imported multiplicity of YAML conformant configuration files:
    parsing the corresponding YAML conformant configuration file; and
    storing each element of the parsed YAML conformant configuration file in a database;
  generating a data model from the stored elements in the database;
  determining whether performance of a contemporaneously executing container in the containerized environment fails to satisfy a threshold value;
  in response to determining that performance of the contemporaneously executing container fails to satisfy the threshold value, automatically selecting a data visualization from a plurality of data visualizations, the selected data visualization comprising a visualization comparing each element of the corresponding parsed YAML conformant configuration file that reflects the configuration of the contemporaneously executing container with at least one different parsed YAML conformant configuration file that reflects the configuration of a different corresponding contemporaneously executing container in the containerized environment; and
  presenting the selected data visualization of at least a portion of the generated data model including elements from the corresponding parsed YAML conformant configuration file that reflects the configuration of the contemporaneously executing container and the at least one different parsed YAML conformant configuration file that reflects the configuration of the different corresponding contemporaneously executing container in the containerized environment.

16. The computer program product of claim 15, wherein the selected data visualization indicates a deviation of the parsed YAML conformant configuration file that reflects the configuration of the contemporaneously executing container from the at least one different parsed YAML conformant configuration file that reflects the configuration of the different corresponding contemporaneously executing container in the containerized environment.

17. The computer program product of claim 15, wherein the selected data visualization indicates a deviation of the parsed YAML conformant configuration file that reflects the configuration of the contemporaneously executing container from a standard configuration reflected by another configuration reflected by another of the imported YAML conformant configuration files.

18. The computer program product of claim 17, wherein the multiplicity of YAML conformant configuration files each reflect a configuration of a corresponding short-lived Linux container.

19. The computer program product of claim 18, wherein the presentation of the selected data visualization includes elements of the corresponding parsed YAML conformant configuration file that reflects the configuration of the contemporaneously executing short-lived Linux container and elements from the at least one different parsed YAML conformant configuration file that reflects a configuration of a similar previously executed short-lived Linux container.

20. The computer program product of claim 19, wherein the method further includes applying the YAML conformant configuration file of the similar previously executed short-lived Linux container to the contemporaneously executing short-lived Linux container responsive to determining that performance of the contemporaneously executing short-lived Linux container fails to satisfy the threshold value.

* * * * *